United States Patent [19]

Dakin et al.

[11] Patent Number: 4,701,603
[45] Date of Patent: Oct. 20, 1987

[54] FOCUS CONTROL SYSTEM FOR OPTICAL INFORMATION RECORDER OR PLAYER

[75] Inventors: W. Ray Dakin, Huntington Beach; John F. N. Browne, Laguna Niguel, both of Calif.

[73] Assignee: Optical Disc Corporation, Cerritos, Calif.

[21] Appl. No.: 788,479

[22] Filed: Oct. 17, 1985

[51] Int. Cl.$^4$ .............................................. H01J 40/14
[52] U.S. Cl. ........................... 250/201; 250/214 AG; 369/45
[58] Field of Search .................. 250/201 AF, 201 DF, 250/204, 214 AG; 369/45

[56] References Cited

U.S. PATENT DOCUMENTS

| | | | |
|---|---|---|---|
| 3,906,389 | 9/1975 | Matsumoto et al. | 250/214 AG X |
| 3,961,177 | 6/1976 | Hatchet | 250/201 AF |
| 4,352,564 | 10/1982 | Roach | 356/237 X |
| 4,395,122 | 7/1983 | Southgate et al. | 336/237 |
| 4,429,967 | 2/1984 | Tokuda et al. | 250/214 AG X |
| 4,439,848 | 3/1984 | Ceshkovsky et al. | 250/201 DF X |
| 4,446,546 | 5/1984 | Miller | 250/201 DF X |
| 4,475,182 | 10/1984 | Hosaka | 250/201 DF X |
| 4,541,084 | 9/1985 | Oku et al. | 250/201 DF X |
| 4,611,317 | 9/1986 | Takeuchi | 369/45 |
| 4,614,863 | 9/1986 | Sato | 250/201 DF |

Primary Examiner—Eugene R. LaRoche
Assistant Examiner—David Mis
Attorney, Agent, or Firm—Steven P. Brown

[57] ABSTRACT

A focus control system with a novel gain control circuit for continually varying the gain of the focus error signal based on the optical characteristics of the medium. As those optical characteristics change to decrease the amount of light available to the focus error detector, the gain of the focus error signal is increased so that the overall gain of the servo loop and the overall response of the servo to a focus error remains constant. This is accomplished by monitoring the optical characteristics of the medium which affect the focus error detector. In a multiple detector system, the outputs of all of the detectors are summed together. The resultant signal is a reflectivity or a transparency signal and is used in a novel circuit for controlling the servo gain.

12 Claims, 5 Drawing Figures

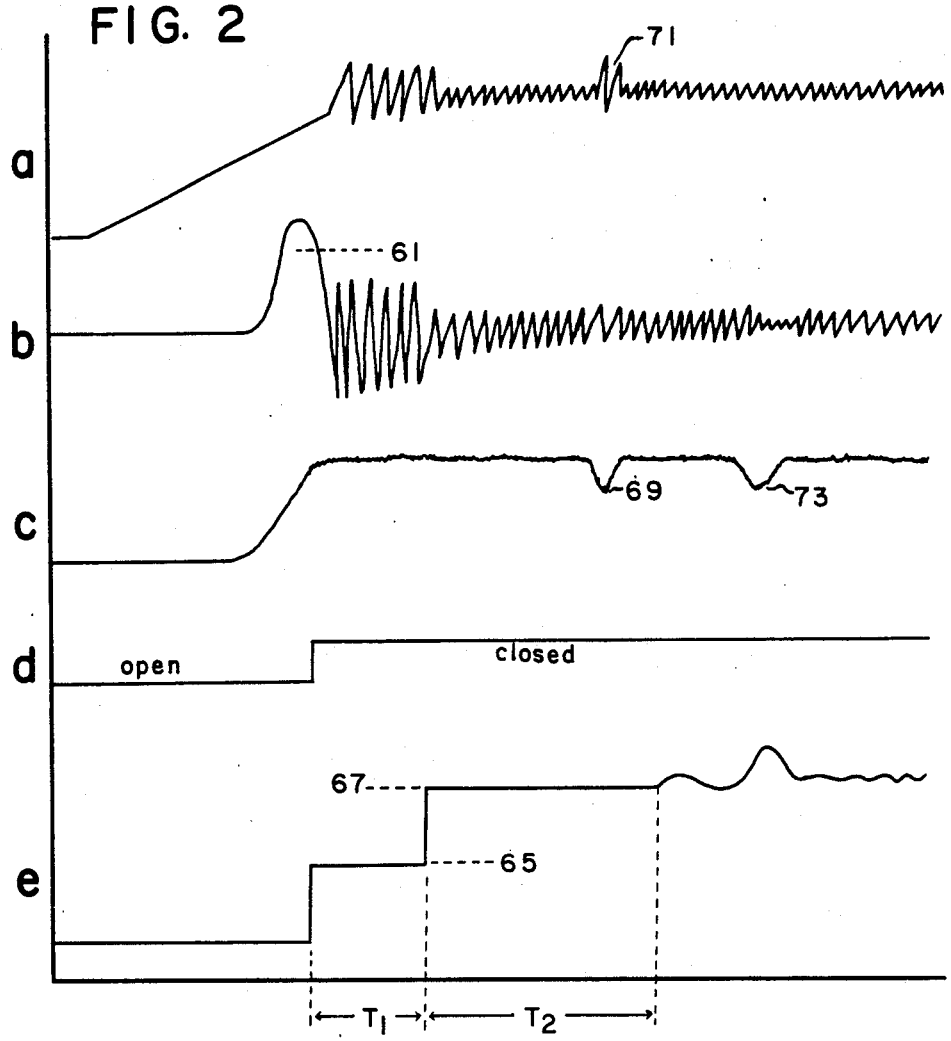
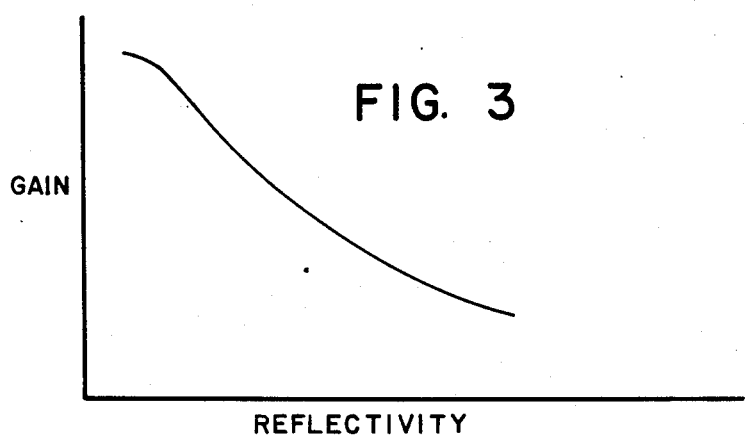

FIG. 4
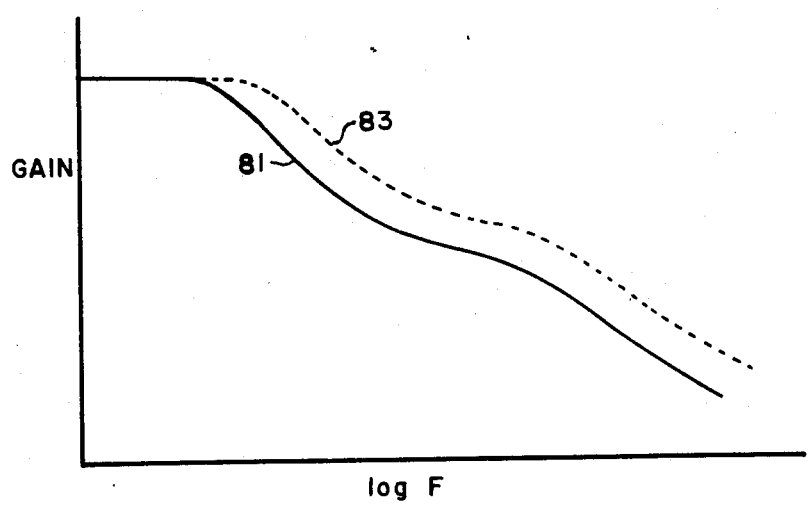
FIG. 5
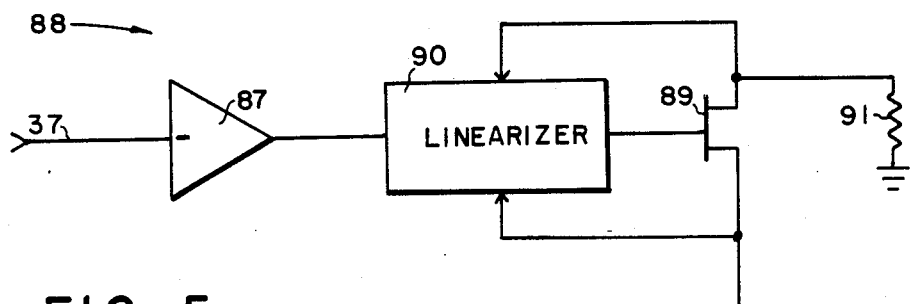
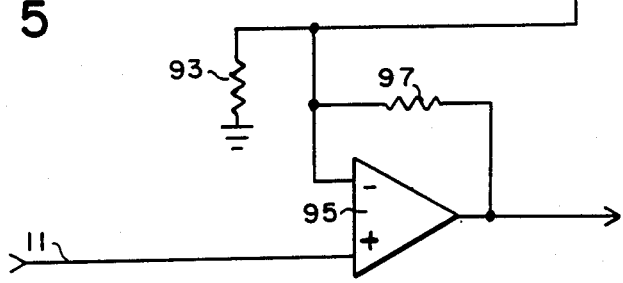

FOCUS CONTROL SYSTEM FOR OPTICAL INFORMATION RECORDER OR PLAYER

FIELD OF THE INVENTION

The present invention relates to the field of optical information storage systems such as optical information recorders and players. More specifically, the present invention relates to a focus control system for maintaining a writing or reading beam of light in focus on a moving optical information surface.

DESCRIPTION OF THE PRIOR ART

Since the depth of field or the objective lenses used in typical optical recording and reproducing systems are very limited, a focus servo system must be used to move the point of focus of the beam to closely follow movements of the information surface. Servo systems are known which detect the relative position of the point of focus of a beam of light and the information surface. These servo systems typically operate by sensing the position of a complimentary point of focus relative to a detector, or by measuring the shape or size of a reflected or transmitted portion of the light beam and by comparing that shape or size to a known shape or size. Any of these known techniques produce a focus error signal. U.S. Pat. No. 4,152,586 discloses one such system using concentric ring photodetectors. U.S. Pat. No. 3,997,715 discloses a similar system using two spaced photodetectors with apertures through them. U.S. Pat. No. 4,357,533 discloses a system in which a beam is divided and the two components of the beam travel along separate paths of unequal length through a single aperture to respective photodetectors.

The first mentioned prior art system compares the size of the beam with a standard size which would equally illuminate the two photodetector sections. The latter two prior art systems compare the complimentary point of focus position with the position of the two photodetectors or the single aperture, respectively.

Various means are known for adjusting the position of the point of focus of a light beam relative to the moving information surface of the medium. The most common way is to move the objective lens using some type of electromechanical transducer. However, it is also possible to shift the focus by moving other optical elements or by changing the shape of an element as disclosed in U.S. Pat. No. 4,445,209. For simplicity, the examples herein will assume a moving objective lens.

Since the working distances of the high numerical aperture lenses used in typical optical recording and reproducing systems are very short, the lens must be very close to the medium when reading or writing information. However, in order to prevent accidental contact between the lens and the medium at other times, the lens is usually withdrawn from the medium until writing or reading begins. For this reason, a separate system is required to initially move the lens toward the medium and into the effective range of the focus error detection system. Such systems are called focus acquire systems and are normally composed of a simple ramp generator which moves the lens from a position distant from the recording medium to an in-focus position. Such a system is disclosed in U.S. Pat. No. 4,439,848.

Because the transfer characteristic of most focus error detection systems is nonlinear and ambiguous except for a very narrow range of focal positions, the focus error signal is normally uncoupled from the focus adjusting transducer so that the focus system is in an open loop mode until the acquire system brings the focal point within the linear operating range of the focus error detector. Threshold detectors responsive to the focus error signal or zero crossing detectors responsive to the focus error signal, or other detectors sensing the recovery of a signal from the medium have typically been used to trigger the closing of the focus servo loop.

However, when closing the loop, a relatively large focus error signal may be present or may occur immediately after the closing of the loop due to the momentum of the lens from the acquire system or due to movement of the medium. The closed loop response to these large error signals can cause the lens to be accelerated uncontrollably by the focus adjusting transducer causing the lens to strike the medium or causing the lens to exceed the operating range of the focus error detection system.

Furthermore, since the focus error detection system depends upon light either reflected or transmitted by the optical medium, the amplitude of the focus error signal is affected by both the actual focus error and the reflectivity or transparency of the medium. Fingerprints or dust on the medium can cause instantaneous changes in the reflectivity or transparency of the medium which will result in erroneous changes in the focus error signal and erroneous or inadequate movement of the focus adjusting transducer. Additionally, since most optically recordable media store information as an alternating series of regions of optical contrast, the overall reflectivity or transparency of such a medium varies greatly between recorded areas and unrecorded areas. Accordingly, the reflectivity or transparency of the medium will change dramatically and instantaneously as the recording process is started and stopped.

All of these factors cause unwanted and erroneous focus error signal variations which lead to erroneous or inadequate operation of prior art focus control systems.

SUMMARY OF THE PRESENT INVENTION

Accordingly, it is an object of the present invention to provide a focus control system which overcomes these deficiencies in the prior art, and which is not susceptible to the erroneous operation of the prior art systems. It is a further object of the present invention to provide a focus control system which makes a reliable transition from an open loop acquire stage to closed loop operation and which reliably maintains proper focus in spite of changes in media reflectivity or transparency.

In its broadest aspect, the present invention comprises a focus control system with a conventional focus error detector, a conventional focus position adjusting transducer and a novel gain control circuit for continually varying the gain of the focus error signal based on the optical characteristics of the medium. As those optical characteristics change to decrease the amount of light available to the focus error components, the gain of the focus error signal is increased so that the overall gain of the servo loop and the overall response of the servo to a focus error remains constant. This is accomplished by monitoring the optical characteristics of the medium which affect the focus error detector. In a multiple detector system, this can be accomplished by simply summing together the outputs of all of the detectors. For a reflective media the resultant signal is a reflectivity signal. For a transmissive media, the signal is a transparency signal.

Further aspects and advantages of the invention will become apparent in connection with the description of the following preferred embodiment.

DESCRIPTION OF THE FIGURES

FIG. 2 is a timing chart showing the states of various control signals in the system of FIG. 1 from the beginning of an acquire cycle through stable closed loop operation;

FIG. 3 is a plot of gain versus reflectivity for a reflective embodiment of the present invention;

FIG. 4 is a preferred frequency response plot for a servo system incorporating dynamic gain adjustment; and FIG. 5 is a schematic diagram of a representative gain control circuit usable with the present invention.

DETAILED DESCRIPTION OF THE PREFERRED EMBODIMENTS

Figure 1:
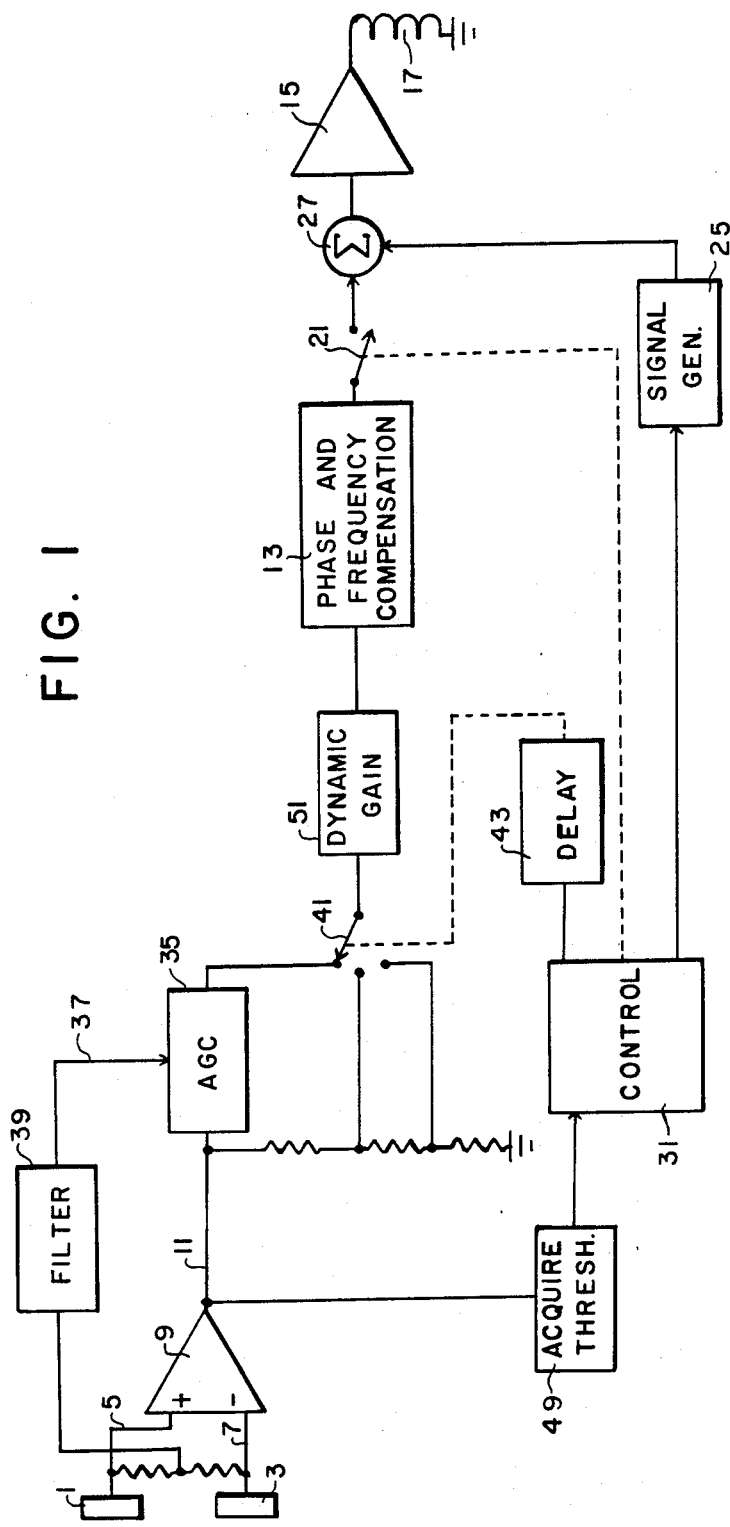
FIG. 1 is a block diagram of a complete focus control system in accordance with the present invention.

As explained above, a focus system for use in an optical information recorder or player must include systems for bringing a limited focal depth optical system from an initial out-of-focus condition to an in-focus condition and further systems for reliably maintaining that focus condition as the medium moves relative to the light beam and as the optical characteristics of the medium change due to the information content of the medium, the writing of information, and various defects of the medium.

FIG. 1 illustrates a preferred arrangement of subsystems connected to perform these functions in accordance with the present invention. The system illustrated by this figure is specific to a focus error detector which measures the error by comparing the relative amplitudes of lights impinging two separate photodetectors. Minor changes to the disclosed system to accommodate alternate focus error detection schemes will be apparent to those skilled in the art. For convenience, it will be assumed that the disclosed system is used with a reflective medium.

Photodetectors 1 and 3 receive respective portions of the light reflected from the medium. When the light beam is properly focused on the medium, the outputs 5 and 7, respectively, from these photodetectors will be identical. Any difference between these outputs indicates a focus error, or offset between the plane of focus of the beam and the information surface of the medium. The two signals are compared by differential amplifier 9 to produce an appropriate focus error signal in accordance with known methods.

In prior art focus control systems, this focus error signal would be fed directly to a phase and frequency compensation circuit 13 to tune the response of the electrical components of the focus servo to match the characteristics of the optical and mechanical elements of the system to achieve the overall system response required. The design of the phase and frequency compensation network is well known in the field of electro-mechanical servos and need not be discussed here.

When operating in closed loop mode, the phase and frequency compensated error signal is fed to a focus control driver 15 which powers the actual electro-optical or electro-mechanical device which controls the point of focus of the beam. For example, the driver 15 may control a voice coil like solenoid 17 which moves an objective lens. Alternatively, the driver 15 may be directly coupled to a piezo-electric element which moves an optical element or which is itself an optical element.

Since the focus error signal is properly indicative of the actual focus error only over a relatively narrow range, the focus control system must be operated in an open loop mode until the point of focus is within this range. Loop switch 21 selectively couples and uncouples the focus error signal from the driver 15 for establishing open loop or closed loop modes of operation.

In order to initially move the point of focus to within the operating range of the servo, the output of an acquire signal generator 25 is coupled to the driver 15 through a summing point 27. This signal is conventionally a sawtooth waveform, but could also be a sine wave or exponential curve. The acquire signal generator is triggered by a control circuit 31 which also controls the servo loop switch 21.

The focus control system of the present invention differs from the prior art systems by the inclusion of an automatic gain control 35 and other gain altering components affecting the focus error signal between the differential amplifier 9 and the output driver 15. During stable closed loop operation of the focus control system of the present invention, the focus error signal gain is continuously controlled by the automatic gain control circuitry 35 based on a control signal 37. In the reflective medium embodiment of FIG. 1, the control signal 37 is basically a reflectivity signal indicative of the total amount of light reflected by the medium and impinging on the two focus detectors 1 and 3. As shown in FIG. 1, this signal can be derived by simply summing together the signals from photodetectors 1 and 3.

The automatic gain control circuit is advantageous because the measured difference between the signals output by photodetectors 1 and 3 varies in amplitude with the reflectivity of the medium. That is, for a constant actual focus error, the focus error signal 11 will decrease with decreasing reflectivity of the medium. The automatic gain control circuit 35 increases the amplitude of the error signal 11 as the reflectivity signal 37 decreases. An optional filter circuit 39 may be included to limit the bandwidth of the control signal 37 and filter out high frequency reflectivity changes indicative of information recorded on the medium or light beam intensity variations during the writing process. Additionally, the circuit 39 may have a nonlinear transfer characteristic establishing maximum and minimum gains for the focus error signal as the reflectivity varies from zero to the maximum reflectivity of the medium.

Because the photodetectors 1 and 3 are in the reflected light path of the optical system being controlled by the output of these two detectors, the reflectivity signal derived from the sum of the outputs of these two detectors will also be affected by the focal condition of the optical system. That is, an apparent decrease in reflectivity will occur as the actual focus error increases. When the system is in a steady state condition, this effect will cause an increase in the gain of the servo system during large focus errors, which will tend to stabilize the system.

However, during the initial acquire cycle of the focus control system, relatively large focus errors commonly exist when the focus servo loop switch 21 is initially closed. If the automatic gain control circuitry 35 is functioning at that time, the gain of the system will be at a very high level and the relatively large actual focus error combined with the relatively low effective reflectivity will result in an extremely large driving signal output by the driver 15. This combination of high initial offset and high initial gain results in an undesirable and unstable acquire system. Accordingly, in accordance with a further preferred aspect of the present invention, a switch 41 is provided for defeating the automatic gain control circuitry until stable closed loop operation of the servo has been established. As shown in FIG. 1, the switch 41 can be embodied as a multiposition switch varying the gain of the focus error signal between an initial low value providing a stable initial "soft acquire" response, a second fixed gain level providing normal closed loop operation of the servo circuitry, and a third position allowing automatic gain control of the focus error signal. Alternatively, the switch 41 may merely operate between an initial fixed value and subsequent automatic gain control.

While the switch 41 has been shown in the path of the focus error signal, an artisan will recognize that the switch could also be placed in the control loop of the reflectivity signal 37.

The switch 41 is preferably controlled by the control circuit 31 so that the position of the switch 41 is coordinated with the operation of the acquire signal generator 25 and the focus servo loop switch 21. A delay circuit 43 may be used to establish fixed periods of time for sequencing through the different positions of the switch 41. For example, the delay circuit may be triggered by the closing of focus servo loop switch 21 to cause the gain of the servo system to be at the "soft acquire" level for a first time period $T_1$. At the end of $T_1$, the delay circuit would cause the switch 41 to change the focus servo loop gain to a higher fixed value for a time period $T_2$. At the end of $T_2$, the delay circuit would cause the switch 41 to initiate automatic gain control.

The initial closing of the focus error loop switch 21 may be controlled by the instantaneous amplitude and/or the slope of the focus error signal as measured by the acquire threshold detector 49. For example, the acquire threshold detector can be used to sense when the point of focus of the light beam is moving toward the information surface of the medium and is within a predetermined distance of the medium by simply sensing the slope of the focus error and by comparing the amplitude of the focus error with a preset threshold value. When the amplitude of the focus error is less than this preset threshold value, the detector 49 will output a signal to the control circuit causing the control circuit to close the focus servo loop switch 21 and terminate the output of the acquire signal generator 25.

Dynamic gain network 51 is a further optional feature which changes the response of the focus servo to high amplitude "dynamic" error signals. In other words, the response of the servo to relatively low amplitude error signals which fall below the predetermined threshold level will be different from the response of the servo to high amplitude signals which exceed the threshold level. Typically, the high frequency response of the servo will be higher for the high amplitude signals than it will be for the low amplitude signals.

FIG. 2 is a timing chart or histogram of the operation of the focus control system of the present invention starting prior to the initiation of the acquire routine. The line 2a is the actual lens position relative to the information surface of the medium. Line 2b is the focus error signal 11 as output by the differential amplifier 9, and line 2c represents the reflectivity signal 37. Line 2d shows the condition of the focus servo loop switch 21, and line 2e shows the focus servo loop gain.

At time zero, the lens is at its maximum distance from the medium, no focus error signal is present, and the focus error loop switch is open, giving the servo zero gain. The control circuit triggers the acquire signal generator 25 at this time causing a ramp shaped acquire signal to be output to the lens driver, moving the lens toward the information surface. As shown in line 2b, a focus error signal is generated only as the point of focus closely approaches the information surface. Due to the characteristics of the focus error detector, the initial focus error signal has the incorrect slope for controlling the focus adjusting element. After this error signal passes through a maximum, its slope is inverted as the point of focus continues to approach the information surface. When the error signal passes through the threshold 61 as set in the acquire threshold detector 49, a control signal will be sent to the control circuit 31, causing it to close the focus servo loop 21 and to terminate the acquire signal from generator 25. This signal will also reset the switch 41 to the low gain "soft acquire" 0 level 65.

The relatively low gain of the servo in this condition will be sufficient to continue moving the point of focus toward the information surface, but will avoid a rapid acceleration of the point of focus which could cause it to seriously overshoot the information surface and exceed the dynamic range of the focus error detector. However, the relatively low gain of the servo will be insufficient to cause the point of focus to accurately follow the movements of the information surface along the path of the light beam as the medium moves past the light beam. Accordingly, relatively large focus errors will exist, and the amplitude of the focus error signal will be relatively large.

After a delay of time $T_1$ as fixed by the delay circuit 43, the switch 41 will be moved to its second state, raising the gain of the servo system to a level 67. At this level, the servo system will be capable of more closely following the movements of the information surface of the medium and the actual focus errors and the amplitude of the focus error signal will decrease. However, if the reflectivity of the medium decreases due to a fingerprint or the like as shown at 69, the focus error signal for a given actual focus error distance will decrease, causing the actual focus error distances to increase as shown at 71 in the figure. If this reflectivity decrease was a result of the beginning of recording on a disc, this higher amplitude error section would continue for as long as the recording continued.

Accordingly, after a second time delay of length $T_2$ as established by delay circuit 43, the state of switch 41 is set to its third position so that automatic gain control of the focus error signal is initiated. In this state of the switch, any change in reflectivity of the medium such as shown at 73 will be detected and will cause a corresponding change 75 in the net gain of the gain control circuit 35, causing the net response of the servo to a given focus error to remain constant. Accordingly, the average actual focus error distance will remain relatively constant even when the beam is passing through a fingerprint or changing between reading and writing modes.

FIG. 3 is a plot of the gain of the automatic gain control circuit 35 versus increasing reflectivity of a reflective medium. The gain is preferably nonlinear with reflectivity so that a certain minimum gain is defined and approached asymptotically with increasing reflectivity. This curve is defined by the characteristics of the automatic gain control circuitry and by the filter circuitry 39 which may also advantageously roll off the response of the automatic gain control to prevent high frequency recorded information from having any effect on the gain of the system.

FIG. 4 is a frequency response plot of the servo circuitry showing the effect of the dynamic gain stage 51. The curve 81 represents the response of the system to relatively low amplitude error signals below a threshold determined by the dynamic gain circuit 51. The curve 83 represents the response of the system to errors having an instantaneous amplitude exceeding that threshold.

This type of dynamic response can be achieved using two oppositely-polarized diodes connected in parallel with a fixed resistance as part of a lowpass filter circuit. The resistance of this network will be equal to the fixed resistance for all signals below the threshold voltage of the diodes. The resistance will be defined by the fixed resistance in parallel with the effective resistance of the diode for all signals exceeding the threshold.

FIG. 5 is a block diagram of a preferred gain control stage for the system of the present invention.

The reflectivity signal 37 is used to control a voltage-variable resistor 88. As shown in the figure, the voltage-variable resistor may be composed of an inverting amplifier 87, a FET device 89 and a linearizing circuit 90 which compensates for the nonlinear response of the FET. The circuit 90 may be composed of one or more feedback circuits in accordance with known techniques.

The effective resistance of the voltage-variable resistor 88 and the fixed resistor 91 is connected in parallel with the fixed resistor 93 in the feedback loop of operational amplifier 95. In accordance with known relationships, the gain of the amplifier 95 is defined by the fixed resistors 91, 93, and 97, and by the voltage-variable resistor 88. As the reflectivity signal 37 decreases, the output of inverting amplifier 87 will increase, causing a corresponding decrease in the resistance of FET 89 and an increase in the gain of the amplifier 95.

Naturally, the gain control stage may be constructed in a variety of different ways, and the components of the system of the present invention may be arranged in different ways to fit particular applications. Accordingly, it is intended that the invention not be limited by the disclosed embodiments, but only by the appended claims.

We claim:

1. A focus system for controlling the position of the point of focus of a beam of light relative to an information surface on a reflective recording medium, comprising:
   focus error detection means responsive to a characteristic of the light reflected from said medium for generating a focus error signal indicative of the direction and distance between the point of focus and the information surface;
   focus adjustment means responsive to said focus error signal for altering the relative position of the point of focus of said beam along the path of said beam and toward said information surface; and
   gain control means for continually controlling the gain of the focus error signal based on the reflectivity of the portion of the recording medium being impinged by said beam, whereby said gain control means increases the gain of said error signal when the reflectivity of the medium decreases.

2. The system as claimed in claim 1, wherein said gain control means varies the gain of said error signal according to a nonlinear relationship with total reflectivity whereby the rate of change in gain decreases as the reflectivity increases.

3. The system as claimed in claim 1, further comprising delay means for inhibiting said gain control means and for setting said gain to a predetermined level for a fixed period of time after focus is first acquired.

4. The system as claimed in claim 3, wherein said delay means sets said gain to a first predetermined level immediately after focus is first acquired, and subsequently sets the gain to a second predetermined level higher than said first level.

5. The system as claimed in claim 1, further comprising a dynamic gain stage between said focus error detection means and said focus adjustment means and having a higher effective gain for error signals above a predetermined threshold level than for signals below said threshold level.

6. The system as claimed in claim 1, wherein:
   said focus error detection means includes at least one pair of photodetectors and a differential amplifier outputting said focus error signal based on the difference between the relative amplitudes of light impinging each of said photodetectors; and
   said gain control means includes summing means for determining the reflectivity of the medium based on the total amount of light impinging said photodetectors.

7. A focus acquire and servo system for controlling the position of the point of focus of an incident beam of light relative to an information surface on a reflective recording medium, comprising:
   focus error detection means for analyzing light reflected from the medium and for generating a focus error signal indicative of the direction and distance between the point of focus of the beam and the information surface;
   focus adjustment means for altering the relative position of the point of focus of said beam along the path of said beam;
   a focus servo loop switch having a closed state in which said focus error signal is coupled to said focus adjusting means and an open state in which said focus error signal is disconnected from said focus adjusting means;
   sensing means for measuring the total amount of said incident beam reflected from the medium; and
   gain control means for selectively changing the gain of the focus error signal based on the amount of reflected light measured by said sensing means.

8. The system as claimed in claim 7, further comprising:
   focus acquire means for moving the point of focus toward the medium from an initial point distant from the medium; and
   control means for closing said loop switch when the point of focus is within a prescribed distance from the medium.

9. The system as claimed in claim 8, wherein said control means keeps said loop switch in said closed state after reaching said prescribed distance even if said point of focus is subsequently moved further away from the medium than said prescribed distance.

10. The system as claimed in claim 8, further comprising:
   delay means for inhibiting said gain adjustment means and for setting the gain of said error signal to a fixed value for a period of time after said focus loop switch is closed.

11. The system as claimed in claim 10, wherein:
   said delay means has three states, the first state setting the gain at a first value, the second state setting the gain at a second higher value, and the third state allowing control of the gain by said gain adjustment means; and
   said delay means includes means for changing from said first state to said second state and from said second state to said third state at predetermined times after said loop switch is closed.

12. A method for controlling the position of the point of focus of a beam of light relative to an information surface on a reflective recording medium, comprising:
   generating a focus error signal indicative of the direction and distance between the point of focus and the information surface by analyzing light reflected by the medium;
   continually controlling the gain of the focus error signal based on the average reflectivity of the portion of the recording medium being impinged by said beam, whereby the gain of said error signal increases when the reflectivity of the medium decreases; and
   altering the relative position of the point of focus of said beam along the path of said beam and toward said information surface in response to the gain-controlled focus error signal.

* * * * *